United States Patent [19]

Grosseau

[11] 4,063,052

[45] Dec. 13, 1977

[54] INERTIA SWITCH HAVING A VARIABLE OPERATING THRESHOLD

[75] Inventor: Albert Grosseau, Chaville, France

[73] Assignee: Societe Anonyme Automobiles Citroen, Paris, France

[21] Appl. No.: 639,178

[22] Filed: Dec. 9, 1975

[30] Foreign Application Priority Data

Dec. 13, 1974 France ............................. 74.41211
May 7, 1975 France ............................. 75.14425

[51] Int. Cl.² .................... H01H 35/00; B60T 8/12
[52] U.S. Cl. .......................... 200/61.46; 188/181 R; 200/80 R
[58] Field of Search ............. 200/61.45 R, 61.46, 200/80 R; 188/181 R, 181 A, 181 C, 181 T, 181

[56] References Cited

U.S. PATENT DOCUMENTS

| 2,853,571 | 9/1958 | Henderson et al. | 200/80 R X |
| 2,972,027 | 2/1961 | Henry-Biabaud | 200/61.46 |
| 3,043,927 | 7/1962 | Lockhart et al. | 200/61.46 |
| 3,141,935 | 7/1964 | Brueder | 200/61.46 |
| 3,231,696 | 1/1966 | Castro | 200/80 R |
| 3,563,350 | 2/1971 | Leider | 188/181 A |
| 3,953,691 | 4/1976 | Grosseau | 200/61.46 |

FOREIGN PATENT DOCUMENTS

| 1,235,794 | 5/1960 | France. |
| 1,467,275 | 12/1966 | France. |
| 1,584,077 | 12/1969 | France. |

*Primary Examiner*—James R. Scott
*Attorney, Agent, or Firm*—Fitzpatrick, Cella, Harper & Scinto

[57] ABSTRACT

An improved inertia switch having a variable threshold and operating time comprises a flywheel, a driving member, electrical contact elements carried respectively by the driving member and the flywheel and return means coupled between the driving member and the flywheel. The contact element carried by the flywheel comprises on the one hand a contact terminal integral with a support coupled by friction to the flywheel, the contact terminal co-operating with a part of the contact carried by the driving member, and on the other hand, a contact surface integral with the flywheel co-operating with a second contact part carried by the driving member. The switch is particularly applicable for detecting imminent locking of a vehicle wheel.

11 Claims, 12 Drawing Figures

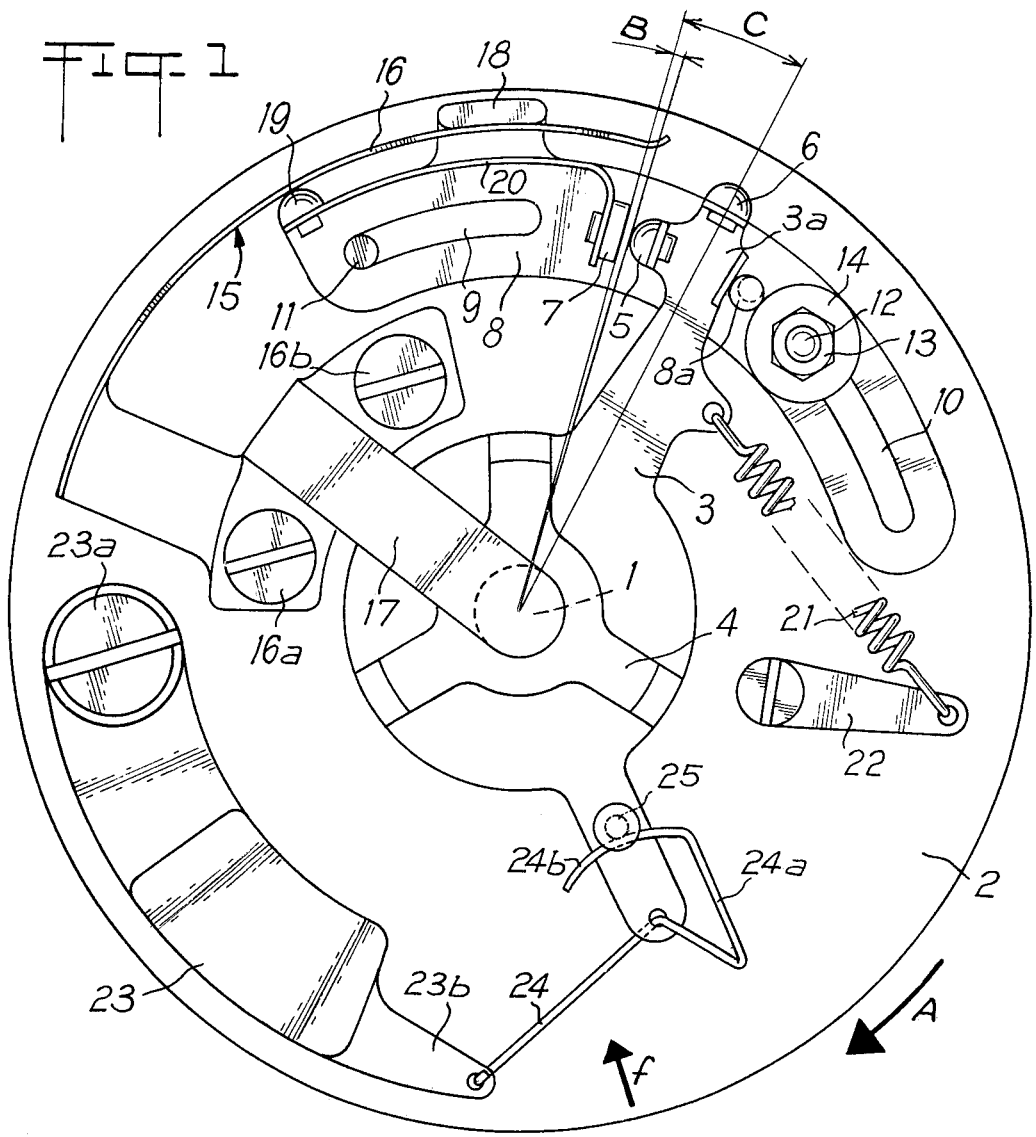
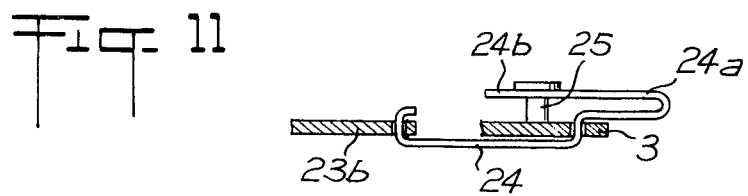

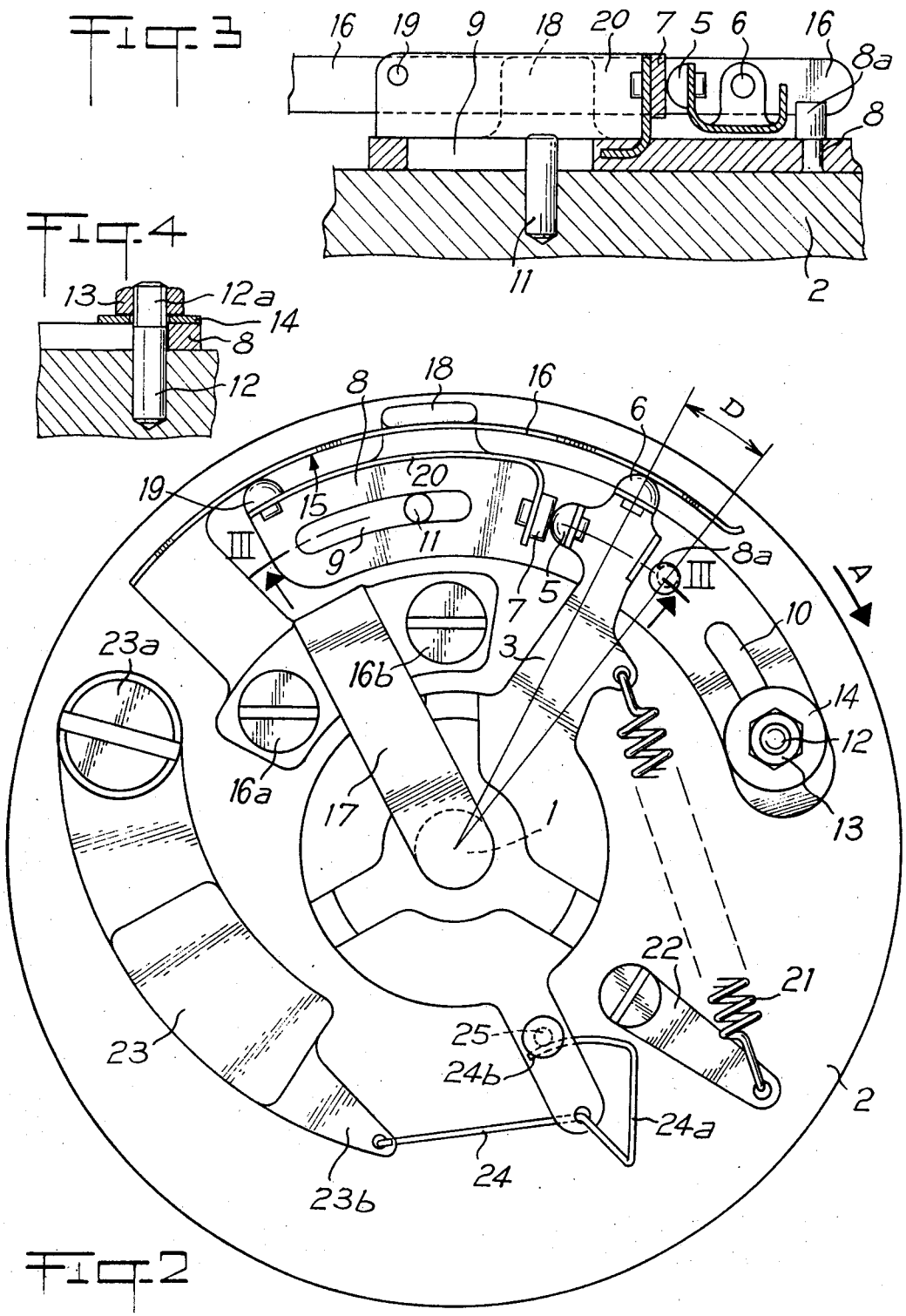

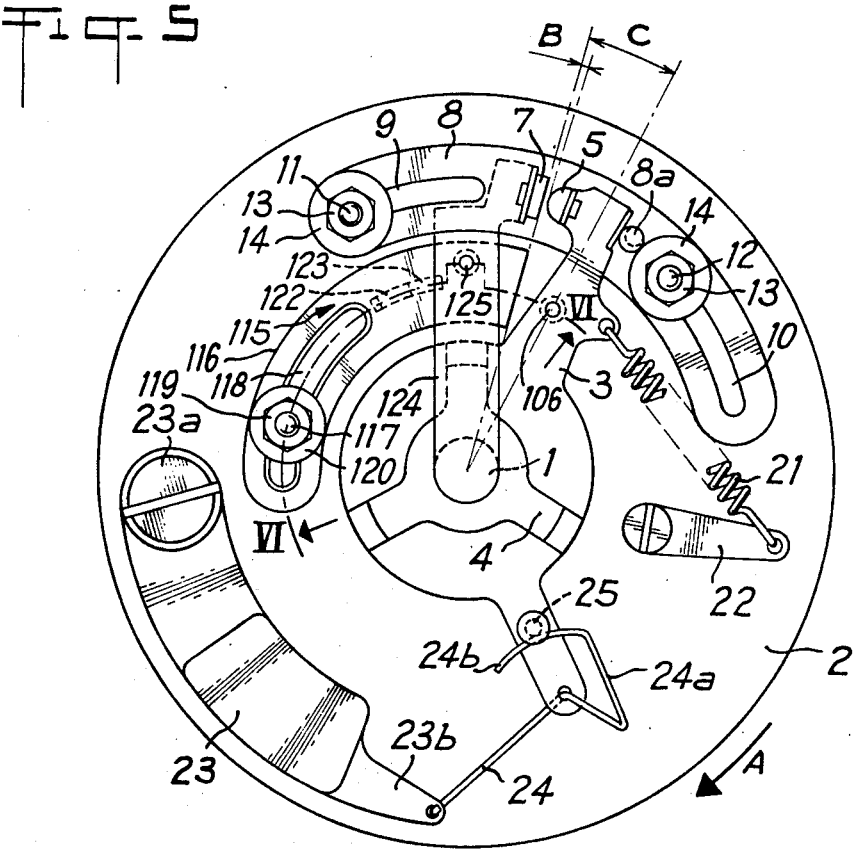
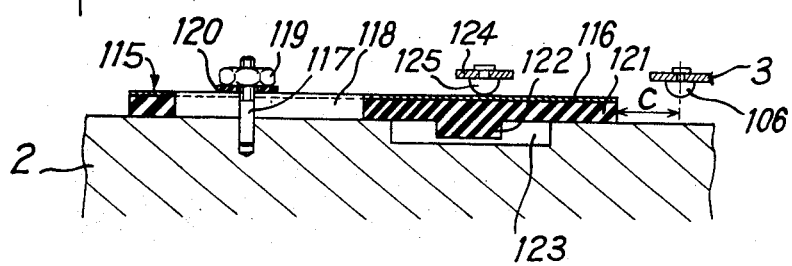

INERTIA SWITCH HAVING A VARIABLE OPERATING THRESHOLD

BACKGROUND OF INVENTION

The present invention concerns an improved inertia switch having a variable operating threshhold, intended particularly for detecting the imminence of locking of a vehicle wheel and the active periods of which are, at least in part, a function of the conditions of adherence encountered locally by the wheels referred to above.

Inertia switches are known, particularly from French Pat. No. 1194791, which are constituted by a flywheel driven by a member integral with a shaft the speed of rotation of which is in accordance with that of the wheel. Or the occurrence of a sufficient deceleration of the wheel, due to braking, the flywheel, due to inertia, pivots with respect to the driving member and this relative movement permits an electric switch to be closed. This switch is generally constituted by two contacts integral respectively, one with the driving member and the other with the flywheel. Resilient and-/or centrifugal means permit the decelerations of the wheel to be detected arising only from the braking action on reaching a threshold of deceleration, fixed or variable, as a function of the speed of the vehicle, below which the switch is not operated. These arrangements are particularly described in French Patent No. 2239008.

With these known switches the operating time, that is to say the time during which the two contacts referred to above are in contact, depends particularly on the conditions of adherence encountered by the wheel.

In fact, when vigorously braking a wheel which is in contact with a surface having a strong adherence for example, the deceleration of the wheel is less brutual than if it had been in contact with a surface of weak adherence. The result is, that at the moment of skidding or the commencement of skidding on a surface having a strong adherence, the interia flywheel of the switch has already slowed down. Its energy, at the moment of contact with the driving member, which is dissipated at the level of a coupling by friction of the driving member pushed by the flywheel on the shaft, is reduced and its speed decreases rapidly from a short contact time. On the other hand under conditions of bad adherence, the deceleration of the wheel is very brutual and takes place without, or practically without, previous slowing down of the speed of the interia flywheel. In this case, the result is considerable energy dissipated by the flywheel; hence, too long a contact time.

The role of these switches is to interrupt the supply to the brakes of the wheel under consideration. As soon as there is closure of the switch, braking force diminishes, consequently the wheel can be turned by contact with the ground. In the case of good adherence, the rotation is rapid and often the driving member regains speed before the flywheel has reached a speed equal to the minimal speed of the wheel. This means that the switch opens at a speed of rotation of the rotating assembly higher than the minimal speed achieved by the wheel when locking is imminent. The latter is also a factor reducing the operating time of the switch. In the case of bad adherence, the turning of the wheel is relatively long which means to say that the driving member regains speed slowly leaving the flywheel time to reduce its speed to a speed approaching the minimal speed of the wheel. Consequently, opening of the switch is produced in this case at a speed of the wheel relatively close to the minimal speed.

Opening of the switch controls the application of the brake source on the wheel. In the case of good adherence, this application does not immediately lead to an imminent locking because the wheel is turning at a sufficiently fast speed. On the other hand, in the case of a bad adherence, this application of braking force acts on an insufficiently rotating wheel and provides the risk of leading to locking of the wheel.

The present invention intends to eliminate this risk while proposing an improved switch in which the advantages of known switches are preserved, particularly in the case of good adherence, and which enables the contact to be maintained closed for a longer time in the case of weak adherence so as to permit the wheel time to rotate more correctly.

To this end, the subject matter of the invention is an improved interia switch, having a variable threshold and operating time intended in particular to detect an imminent locking of a vehicle wheel. The switch comprises a rotary device constituted by an interia flywheel, a member coupled by friction to a driving shaft and capable of rotatably driving the flywheel, electrical contact elements carried respectively by the member and the flywheel and capable of making contact when the flywheel pivots with respect to the member and at least one return member coupled between the member and the flywheel. According to the invention, the above contact element coupled to the flywheel is composed on the one hand of a first part integral with a support coupled by friction to the flywheel and capable of being displaced with respect to the latter, cooperating by a single support with a first part of the contact elements coupled to the above referred to member connected to the driving shaft after a relative rotation of the flywheel with respect to the member at least equal to a first given value and, on the other hand, of a second part integral with the flywheel cooperating through skidding with a second part of the contact elements coupled to the above referred to member after a relative rotation of the flywheel and the above referred to member at least equal to a second given value, the second value being greater than the first value.

In one preferred embodiment of the invention, the support referred to above coupled by friction through the flywheel comprises slides for guiding its displacement with respect to the flywheel, constituted by slots the radius of curvature of which is equal to the difference separating them from the axis of rotation of the rotary device in each of which can slide a pin integral with the flywheel, at least one of these pins being provided at its free end with a screw thread co-operating with a lock nut having a resilient washer ensuring the above mentioned friction between the support and flywheel.

The invention will be better understood in the course of the description given hereafter purely by way of example and non-limiting which will permit isolation of the advantages and the secondary characteristics.

BRIEF DESCRIPTION OF THE DRAWINGS

Reference is made to the attached drawings in which:

FIGS. 1 and 2 are diagrammatic plan views of a first embodiment of the invention in two different states;

FIG. 1(a) is a view illustrating the structure for FIG. 1 in perspective;

FIG. 3 is a view in partial section of FIG. 2 on the line III—III;

FIG. 4 is a view of a detail of FIGS. 1 and 2;

FIG. 5 is a plan view of a second embodiment of the invention;

FIG. 6 is a view in partial section of FIG. 5 along the line VI—VI;

FIG. 11 is a sectional view of a detail taken in the direction of the arrow $f$ in FIG. 1.

DESCRIPTION OF THE PREFERRED EMBODIMENTS

Figure 1:
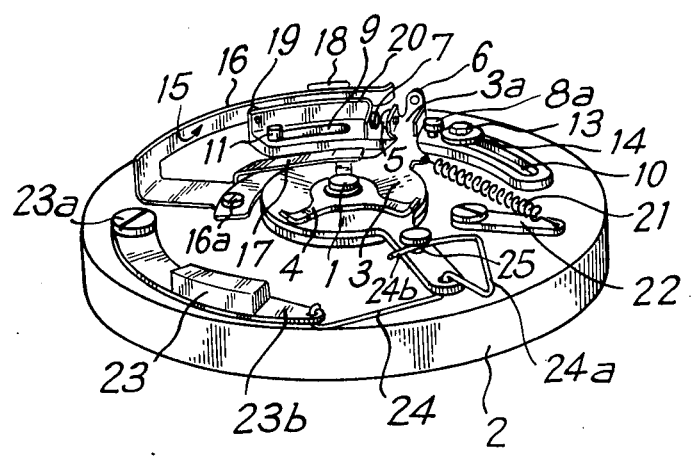

First of all, referring to FIGS. 1 and 2, there can be seen viewed from below, an interia switch similar, in respect of certain members which it comprises, to those described in French Pat. No. 1194791 of the Apr. 17, 1958 and French Pat. No. 2239008 of the July 23, 1973. Thus, it is constituted by a shaft 1 on which an inertia flywheel 2 is fixed in translation but free to rotate. Above this flywheel 2, a driving member 3 is caused to rotate on the shaft 1 through friction by means of an elastic washer 4 held on the shaft by means (not shown) and which flattens the member 3 against a shoulder, (likewise not shown), integral with the shaft 1 situated between the flywheel 2 and the member 3. At its end 3a, this driving member 3 carries a contact element in two parts 5 and 6. With regard to the part 5 there is a contact stud 7 integral with a support 8 coupled by friction to the flywheel 2 and capable of being displaced with respect to the latter. The support 8 comprises two curvilinear arcs 9 and 10 which constitute guide slides for the relative displacement of two pins 11 and 12 integral with the flywheel 2 with respect to the support. As can be seen more specifically in FIG. 4, the pin 12 is threaded at its outer end 12a and carries a retaining nut 13 for a friction washer 14 supported on the support 8. This washer is elastic, and by adjusting the clamping of the screw 13 the frictional force imparted by the support 8 on the flywheel 2 can be regulated. From the shape and dimensions of the arc 9 and 11, it will be seen that the displacement of the support 8 with respect to the flywheel 2 is effected along a circular arc concentric with the shaft 1 and of limited length. Furthermore, the support 8 carries an eccentric 8a capable in view of its driving, of cooperating with the part opposite the contact 5 on the member 3.

The portion 6 of the contact elements carried by the member 3 is capable of being brought opposite a contact surface 15. This contact surface is constituted by the concave surface of a curved strip 16 coupled to the flywheel 2 by two screws 16a and 16b and situated peripherally with respect to the flywheels. The curvature of this strip is constant and the radius of curvature is at least equal to the distance separating the end of that portion of the contact 6 at the axis of the shaft 1 so that when the two members 6 and 16 are opposite one another, there is contact between them. This strip 16 is connected to a small plate 17 outlined in such a manner as to show that it extends above the member 3, its end being straight above the axis of the shaft 1. It is intended to come into contact with an inlet terminal for current carried by its fixed cap covering the device and not shown in the figures.

It will be seen that this strip 16 is maintained in contact with an abutment 18 integral with the support 8 which maintains the strip against the effects of the centrifugal force to which it is subjected when the device rotates. Likewise, it will be noticed that the electrical connection between the contact 7 and the strip 16 is produced through the agency of a contact bead 19 connected by a flexible metallic strip 20 to the contact 7 and maintained constantly in contact with the strip 16 by prestressing.

Furthermore, the FIGS. 1 and 2 show return means coupled between the member 3 and the flywheel 2. These means are constituted firstly by a return spring 21 coupled to the member 3 and in an adjustable manner by a movable arm 22 on the flywheel 2 and secondly by a weighted arm 23 pivoted at 23a to the flywheel and coupled at 23b to the member 3 through the agency of a rigid connection 24 but hinged at its two points of attachment. In this instance, this connection 24 is constituted by a metallic wire of the piano wire type the free end 24a of which, situated beyond the member 3, is curved and co-operates with a stud 25 carried by the member 3. At its end 24b, this portion 24a has curves such that, according to the relative position with respect to the stud 25 and according to the sense of displacement of these two members one with respect to the other, the contact force which it exerts on the stud 25 is variable. FIG. 11 shows the arrangement of the metallic wire 24 in a view taken in the direction of the arrow $f$ in FIG. 1.

FIG. 3 is a view in partial section of FIG. 2 showing the disposition of the contact elements 5,6,7 and 18 with respect to one another. Finally, from the electrical point of view, it will be noted that the elements 7,20,19,16 and 17 are connected to one another and insulated from the other elements of the switch which, themselves, are for example all connected to the chassis of the vehicle.

In order to explain the operation of the switch in accordance with the invention, it will be assumed that the shaft 1 is coupled to the wheel in known manner, the device being capable of being mounted for example, at the end of a wheel axle. The sense of rotation of the device is indicated by the arrow A.

The rotation of the shaft 1 is communicated to the guide member 3 by virtue of the latter being maintained on the shaft 1 by friction. The end 3a of the member 3 is in contact with the eccentric 8a carried by the support 8. Thus, this support is driven by the member 3 and drives the flywheel by at least one of the pins 11 or 12 integral with the flywheel. It will be assumed that the force of the spring 21 is sufficient to just overcome the friction existing between the support 8 and the flywheel 2 in such a manner that at rest the support 8 abuts against one of the pins 11 or 12.

Under the action of a braking force applied to the wheel, a deceleration of the shaft 1 is produced. If the deceleration is not very great, and the flywheel 2 is decelerated at the same time as the member 3 by reason of their interconnection by the means 21 and 23, the system remains in the state shown in FIG. 1. If the deceleration is much greater and the moment of interia of the flywheel 2 is sufficient to overcome forces of the return means 21 and 23, the accummulated values at this instance, constitute the threshold above which locking is imminent. This threshold is variable having regard to the return force of the element 23, and variable with the speed of rotation of the device since it depends on the centrifugal force which is applied to it.

In this second hypothesis there is relative pivotal movement of the flywheel 2 with respect to the member 3. This relative pivotal movement is at least equal to an angle B, small in size, separating the contacts 5 and 7. Thus there is closure of the switch which leads to the release of the braking members coupled to the wheel. With the reducing braking force, the wheel is thus capable of being re-rotated by its contact with the ground. At this moment, it is necessary to consider two conditions of adherence of the wheel with the ground.

Under good conditions of adherence, it will be recalled first of all that the deceleration of the wheel is less sudden than under bad conditions, all other things being equal, and furthermore that the re-rotating of the wheel is more rapid than on a slippery surface.

Under strong adherence for example, the deceleration of the wheel, thus of the member 3, not being very sudden, is accompanied at the outset by a concomitent deceleration of the flywheel 2. Then deceleration rapidly increases, the inertia of the flywheel 2 succeeds in overcoming the return force of the elements 21 and 23. Thus, there is contact between the contacts 5 and 7. The braking force reduces. Due to the effect, on the one-hand, of the response times of the different members controlling the release of the braking members and on the otherhand, to the inherent inertia of the wheel at its re-acceleration due to the contact with the ground, the contact between the contacts 5 and 7 always pivot with respect to the member 3. Thus, there is relative displacement of the support 8 abutting the member 3 at the level of the contact 5 with respect to the flywheel 2. At the moment of closure of the contact, the speed of the flywheel 2 is always reduced as has been stated above. An inertia, generated by this pivoting, results which is not very great and which is rapidly dissipated at the level of the friction of the support 8 on the flywheel and of the cam 24b on the stud 25. Furthermore, the wheel is rapidly rotated due to the fact of the good conditions of adherence. Consequently, the displacement of the support 8 with respect to the flywheel 2 is relatively short and generally less than the angle C separating the contact 6 from the end of strip 16 at rest. The member 3 rapidly regains its speed, the contact 5 becomes detached from the contact 7 within the angle C referred to above. The contact is open and the braking pressure is applied afresh to the wheel. In this connection, it will be noted that the closing and opening of the contact 5, 7 are free because there is no possibility of untimely rebounds or movements of the contact 7 because of the friction produced between the support 8 and the flywheel 2 at the level of the pin 12. Furthermore, when the breaking pressure has been applied afresh to the wheel, the latter is sufficiently rotated, due to the good conditions of adherence to the ground, for the second braking not to involve the risks of immediate locking.

If, on the otherhand, circumstances are imagined where the conditions of adherence of the wheel to the ground are bad, deceleration of the member 3 is very sudden. A large inertia force of the flywheel 2 results which not only can overcome the efforts of the members 21, 23 to return, but can also slide beneath the support 8 maintained in abutment by the member 3 and even, when the pins 11 and 12 reach the position opposite to that in FIG. 1, can cause rotation of the member 3 with respect to the shaft 1. The excess of the inertia force is dissipated in the friction of the member 3 on the shaft 1. With regard to the position of the contacts, in this movement there is first of all closure of the contact 5, 7 which controls the release of the braking members for the wheel. Adherence to the ground not being very good, the wheel has trouble in being rotated and for a time, the speed of the member 3 is one which only moves away very slowly from the minimal speed which it had obtained. Thus, the increase in the speed of the member 3 is not sufficient for the latter to return to a speed higher than that which the flywheel possesses due to inertia, in a short time (particularly within the angle C) then the flywheel 2 continues to pivot with respect to the member 3 and the part 6 of the contact carried by the member 3 comes into contact with the strip 16. Thus, the switch is doubly closed. The movement of the flywheel 2 with respect to the member 3 is continued as long as equality of the speeds of the two parts is not attained. During this movement, the part or contact 6 referred to above slides along the strip 16 until it has traversed an angle D. At that instant, there is no longer relative speed between the flywheel 2 and the member 3 and the switch remains in this state until the real speed of the shaft 1 attains the speed of the flywheel 2 due to the combined effect of the increasing speed of the member 3 and the dissipation of the kinetic energy due to the inertia in the flywheel 2 at the level of friction of the member 3 on the shaft 1. When this balance is achieved, the member 3 always increasing in speed, opening of the contact 5, 7 occurs. Nevertheless, the switch remains closed while the contact 6 is in contact with the strip 16. The contact 6 retraces the angle D referred to above whilst the member 3 returns the support 8 in the sense of the arrow A with respect to the flywheel 2. After having traversed the angle B, the contact 6, 16 is opened and it is only at this moment that the braking pressure is applied afresh to the wheel. During the response times of the control members for the application of the braking pressure, the member 3, aided by the return elements 21 and 23, has had time to return the support 8 into its position in FIG. 1 and to commence through its agency a new rotation of the flywheel 2.

It can be seen that, in the case of good adherence conditions of the wheel with the ground, the switch in accordance with the invention enables a very rapid operation of the switch to be obtained with very short response times, because the angle B is very small. Advantageously, this arrangement allows no loss in stopping distance of the vehicle. If, on the otherhand, adherence is bad, the problem to be solved is situated more at the level of locking. In fact, it is not necessary for the braking pressure to be applied afresh to a wheel which is turning insufficiently. The fact that in this case the time for the closing of the switch is extended after the quality of speeds of the member 3 and of the flywheel 2 has been attained, provides the wheel with an additional period during which its rotation is improved. Finally, it will be noted that the relative displacements of the flywheel with respect to the member 3 are a certain "image" of the state of the wheel with respect to the ground, the wheel being the member 3 and the ground being the flywheel 2. The invention exploits this state of affairs.

FIGS. 5 to 10 illustrate three different embodiments of the switch in accordance with the invention. Certain of the elements are to be found from the previous figures with the same references. In FIG. 5 the pins 11 and 12 are both threaded and both carry a nut 13 and a friction washer 14.

Furthermore, the second part 106 of the contact element carried by the member 3 is capable of being opposite a contact surface 115.

This contact surface is constituted by the outer surface of a strip in the form of a section of a ring 116 attached to the outer surface of the flywheel 2 by at least one member for adjusting and fixing its position. This member, as is shown more specifically with regard to FIG. 6 is constituted by a threaded pin 117 integral with the flywheel 2 passing through the strip 116 into a curved slot 118 and by a nut 119 for clamping the strip to the flywheel.

The existance of an insulating washer 120 will be noticed between the strip 116 and the nut 119. Likewise, FIG. 6 shows that strip 116 is mounted on an insulating support 121 also extending between the pin 117 and the edges of the slot 118 and shaped as a curved hook projection 122 co-operating with a milled portion 123 likewise curved, provided in the flywheel 2, so as to prevent the centrifugal effect of the strip 116 about the pin 117 when the switch is in rotation.

The portion of the contact 106 is disposed beneath the member 3 in such a manner that, when the two elements 116 and 106 are opposite one another there is contact between them.

Furthermore, it will be noted that the contact 7 is integral with a small plate 124 let in at one of its ends to the support 8 thus being displaced therewith and outlined in such a manner as to show that it extends above the member 3, its end being right above the axis 1. It is intended to come into contact with the inlet terminal for the the current carried by a fixed cap covering the device and not shown in these figures.

Finally, it will be seen that the electrical connection between the contact 7 and the strip 116 is provided by the agency of a bead contact 125 carried by the small plate 124 and maintained constantly in contact with the strip 116 by pre-stressing.

Furthermore, FIG. 5 shows the return means coupled between the member 3 and the flywheel 2 which I have described with reference to FIGS. 1 and 2 above.

Figure 7:
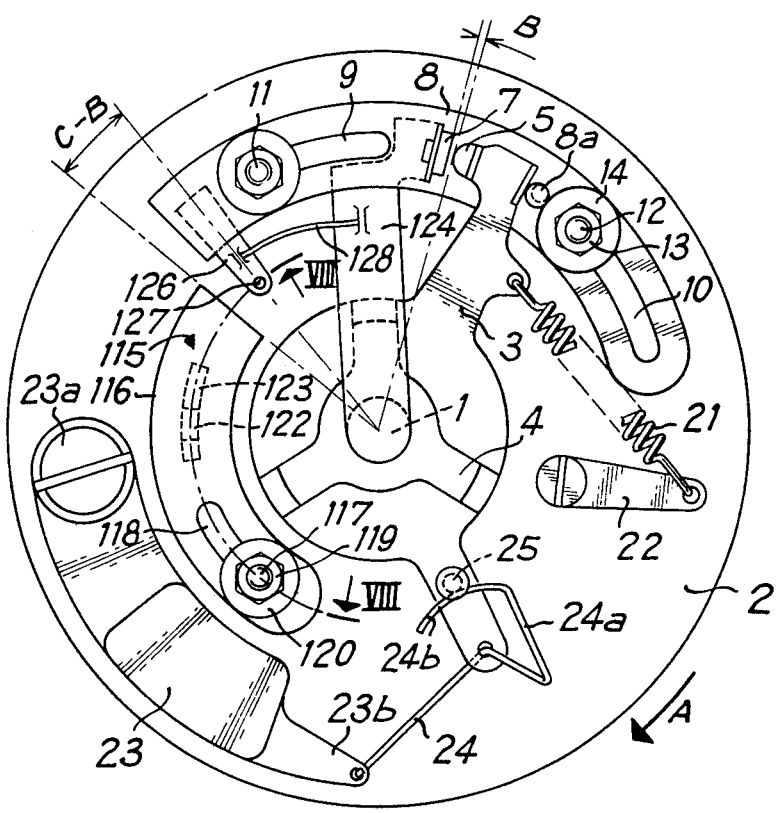
FIG. 7 is a plan view of a third embodiment of the invention.
Figure 8:
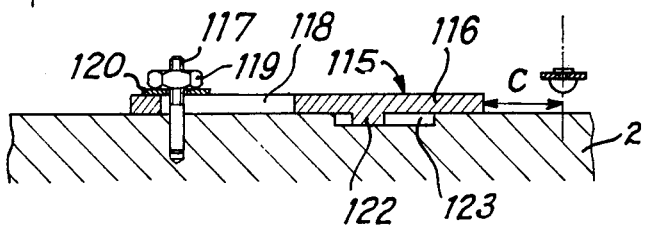
FIG. 8 is a view in partial section of FIG. 7 along the lines VIII—VIII.

In FIGS. 7 and 8 can be found certain of the elements already described with reference to the preceeding figures. It will be seen however that in this instance the strip 116 is mounted directly on the flywheel 2 with the agency of the pin 117. The washer may be insulating or it may be conducting. Through the agency of a small plate 126, the support 8 carries at one of its ends a contact bead 127 connected electrically to the small plate 124 by a connecting wire 128.

Figure 9:
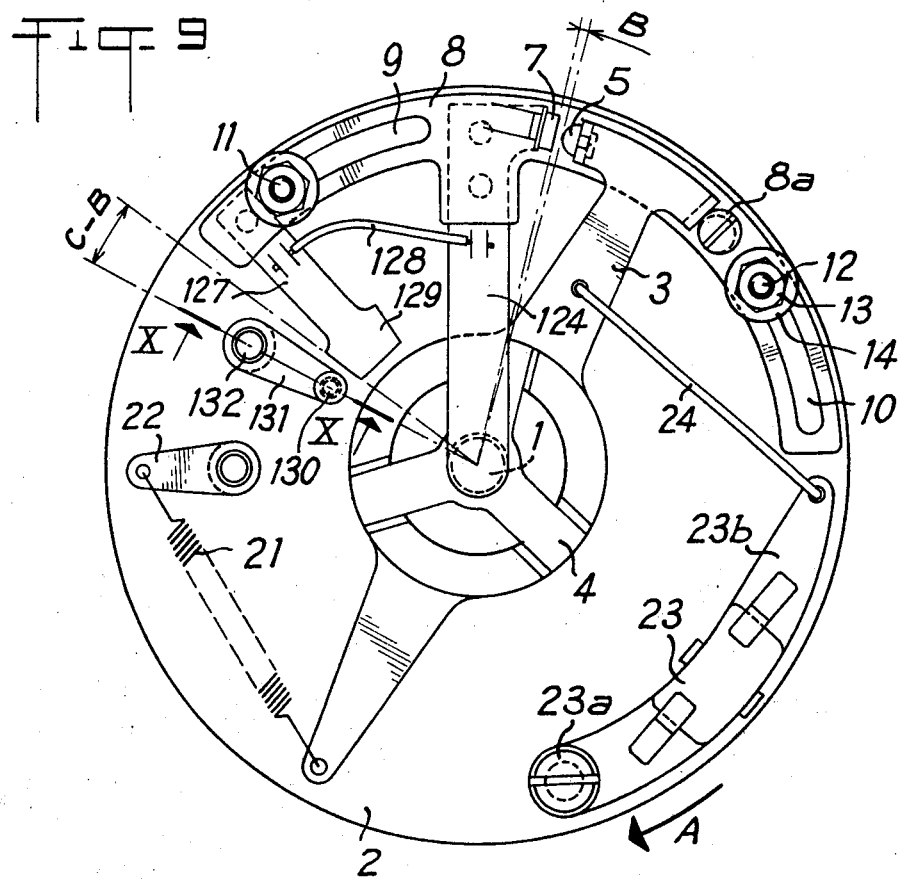
FIG. 9 is a plan view of a preferred embodiment of the invention.
Figure 10:
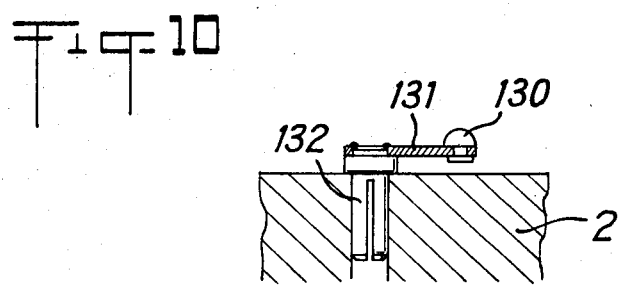
FIG. 10 is a view in partial section of FIG. 9 according to the line X—X.

Then, in FIGS. 9 and 10, there is shown a preferred embodiment of the invention. Again, there are to be found certain elements with the same references previously described. The small plate 127 integral with the support 8 carries at its end an element 129 having a contact surface and which is connected electrically by the connecting wire 128 to the small plate 124.

The element with the contact surface 129 is in the form of an annular segment the lower face of which is capable of entering into contact with and sliding on a bead contact 130 carried by a lever 131 which is itself integral with a pin 132 for fixing it to the flywheel 2. The pin 132 is forced into the flywheel and by rotating the lever 131 about the pin, the distance C-B can be varied, thus C, C and B being the predetermined values defined when the operation of the switch in accordance with the invention is set forth.

The operation of these three various embodiments is similar to that according to the variant of FIGS. 1 and 2.

However, with regard to FIG. 5, it must be noted that, when the switch is open, there is an electrical connection between all the elements constituting the switch due to its construction except for the elements 7, 124, 125, and 116 which are insulated from these constructional elements where they are constantly connected electrically to one another.

Similarly, with regard to FIG. 7, the group of elements insulated electrically from the rest of the switch but connected to one another is constituted by the elements 7, 124, 126, 127 and 128.

Finally, as far as FIG. 9 is concerned, this group comprises the elements 7, 124, 127, 128 and 129.

The result obtained by means of the arrangement according to FIGS. 1 and 2 is summed up in the following manner. When the relative rotation of the flywheel 2 with respect to the member 3 is such that their relative angular displacement is greater than the angle B but less than the angle C, the switch is not closed except when the speed of rotation of the flywheel 2 is greater than the speed of rotation of the member 3. On the other hand, if the relative rotation of the flywheel 2 with respect to the member 3 such that their relative angular displacement is is greater than the angle C, the switch will be maintained closed provided this relative rotation does not become less so as to bring their relative displacement is than the angle C once again.

This result is obtained in the same manner with the arrangement according to FIGS. 5 to 10. It will be noted that in order to close the switch, it is necessary to establish an electrical connection between the small plate 124 and the member 3.

In the variant of FIG. 5 within the angle C, the switch is closed at the level of the contacts 5 and 7. With a relative rotation of the flywheel 2 with respect to the member 3 greater than the value of angle C, the switch is doubly closed by contacts 7 and 5 on the one hand, and by the bead 125, the strip 116 and the contact 106 on the other hand, as long as the speed of rotation of the flywheel 2 is greater than that of the member 3. It is only simply closed by 125, 116 and 106 when the speed of the flywheel 2 has become lower than that of the member 3. It is finally opened when the relative rotation of the flywheel 2 with respect to the member 3 has become less than angle C.

Likewise, in the variant of FIG. 7, there will be closure of the switch by contacts 5 and 7 for a relative rotation less than angle C. The double closure will take place subsequently on the one hand through contacts 5 and 7 and on the other hand through the wire 128, the small plate 126, the bead 127, the strip 116 which is at the same potential, more particularly through the flywheel 2 and the shaft 1 than through the member 3. The simple closure is then ensured by the latter circuit while the relative rotation has not become lower than angle C. It will be seen in FIG. 7, as already in FIG. 9, that the angle C-B, has been set so as to remain homogeneous with the values B and C defined above. In the variant of FIG. 9, the second of last closure of the switch is ensured when the relative rotation of the flywheel 2 with respect to the member 3 is greater than the value C through the members 128, 127, 129, 130, 131, 132, then more particularly through the flywheel 2 and the shaft 1.

The particular arrangements described with regard to these figures chiefly enable operation with a regulation at the value C described above and subsequently to prevent a possible centrifugal effect on the contact surface carried by the flywheel.

Finally, there has been described above with respect to FIGS. 1, 2, 5, 7 and 11, a metal wire 24 connecting the end 23b of the weighted arm 23 and the member 3. The portion of this wire 24 disposed between the arm and the above member, plays the same role as the small bar described in U.S. Pat. No. 2239008 of the July 23, 1973. On the other hand, the parts 24a and 24b of this wire, which is of the piano wire type, then possess a certain elasticity which extends beyond its point of connection with the member 3 playing the part of a resilient cam coupled to the flywheel 2 and maintained in permanent contact with the stud 25 carried by the member 3. In particular, the curves given to the part 24b of this wire have been determined experimentally in such a manner that its action on the stud is variable as a function of the angles of relative displacement of the flywheel with respect to the member 3 and of the sense of this relative displacement.

The situation is with regard to FIG. 1 and it is supposed first of all, that the relative sense of rotation of the flywheel with respect to the member 3 is in the sense of the arrow A. Thus, by virtue of this cam element, when the angle B has been traversed there is no force on the part of the end 24b of the wire exerted on the stud 25. When the angle(C-B) has been traversed, the end 24b mentioned above exerts a force on the stud 19 tending to lessen the movement of the flywheel 2, thus to reduce the period of contact between the contacts 5 and 7. This arrangement enables the time required for bringing the release of the braking members into operation to be reduced, thus consequently to reduce losses in stopping distance.

When subsequently the flywheel is located within the angle D with respect to the member 3, the above mentioned wire-cam does not exert any force on the stud 25. In the sense of rotation opposite to that considered previously, there is no force when the angle D is traversed. At the level of the limit position separating the angle D and the angle C, the curve of the wire 24 is such that a retarding force is applied to the flywheel 2 so as to assist the opening of the contact 6, 16 and to render it more free. Then, when in the sense of rotation it is the angle (C-B) which is traversed, the force applied to the stud 25 tends to increase the rigidity of the coupling of the member 3 to the flywheel 2 in such a manner as to assist the rotation of the flywheel by the said member.

To recapitulate, the end 24b of the wire 24 acts as a supplementary resilient return means disposed between the member 3 and the flywheel 2 the efforts of which are limited for a certain range of relative displacements of the flywheel with respect to the member 3 corresponding substantially to the angle (C-B).

The invention finds an interesting application in the field of automobile construction.

It is not limited to the description which has just been provided but on the contrary covers all variations which could be made to it without departing from its scope or its concept.

I claim:

1. An improved inertia switch having a variable operating threshold for detecting impending locking of a rotary device, such as a vehicle wheel, comprising:
   a shaft mounted for rotation by said rotary member;
   a flywheel mounted on said shaft for idling rotation relative thereto;
   a stop carried by said flywheel;
   a flywheel drive member mounted on said shaft for rotation therewith and cooperable with said stop to drive said flywheel in said direction of rotation;
   return means coupled between said flywheel and said drive member, the effect of which tends to maintain the said stop in contact with said drive member;
   a support member frictionally coupled to said flywheel and capable of being displaced relative thereto;
   two pairs of contact means, each pair comprising contact elements, said first pair of contact means being normally open when said drive member engages said stop and including a contact element mounted on said drive member and a contact element mounted on said support member, said contact elements being arranged to be closed upon relative movement of said flywheel and said drive member through a predetermined annular distance, said second pair of contact means being normally open when said drive member engages said stop and including a contact element mounted on said flywheel and a contact element carried by one of said members and shiftable upon movement of said drive member relative to said flywheel through a predetermined annular distance greater than said first mentioned annular distance to effect contact with said contact element of said second pair of contact means mounted on said flywheel.

2. An improved switch according to claim 1, wherein said support member comprises slides for guiding its displacement with respect to pins carried by said flywheel, said slides being constituted by slots the radius of curvature of which is equal to the distance separating the axis of rotation of the rotary device, at least one of the said pins being provided at its free end with a thread cooperating with a nut for maintaining a resilient washer ensuring the said friction between said support member and said flywheel.

3. An improved switch according to claim 1, wherein said contact element of said second pair of contact means and carried by said flywheel is a contact surface on which said contact element of said second contact means and carried by one of said members is capable of sliding.

4. An improved switch according to claim 3, wherein said contact surface is constituted by a curved strip coupled to the flywheel the radius of curvature of which is at most equal to the distance separating the axis of rotation from the contact element mounted on said drive member.

5. An improved switch according to claim 4, wherein said support means is provided externally with an abutment for retaining said strip against the centrifugal force to which it is subjected.

6. An improved switch according to claim 3, wherein said contact surface, carried by the flywheel, is constituted by a flat circular segment coupled to the outer surface of the said flywheel by means of a member for regulating and maintaining its position with respect to the contact element mounted on said drive member.

7. An improved switch according to claim 2, wherein said contact element mounted on said flywheel is a contact terminal, the position of which is adjustable with respect to the flywheel and is capable of cooperating by friction with said contact element carried by said one of said members which contact element is constituted by a flat surface area parallel to the outer surface of the flywheel.

8. An improved switch according to claim 7, wherein said contact element carried by one of said members is carried by said support member.

9. An improved switch according to claim 2, wherein said stop is carried by said support member, said stop being constituted by a pin having a portion studded in said support member and having a second portion eccentric relative to said studded portion and normally engaged by said drive member.

10. An improved switch according to claim 1, comprising a resilient cam coupled to the flywheel and in contact with a stud carried by said drive member by a surface the shape of which is such that the force exerted by the said cam on said member is variable as a function of the relative rotation of the flywheel with respect to the said drive member.

11. An improved switch according to claim 10, in which said return means includes a weighted arm pivoted at one of its ends to the said flywheel and coupled to said drive member at its other end by means of a metallic wire of the piano wire type the free end of which beyond the driving member constitutes said cam.

* * * * *